(12) United States Patent
Yu et al.

(10) Patent No.: US 8,498,068 B2
(45) Date of Patent: Jul. 30, 2013

(54) LENS MODULE

(75) Inventors: Sheng-Jung Yu, New Taipei (TW);
Chien-Nan Lai, New Taipei (TW);
Yen-Chun Chen, New Taipei (TW);
Tsung-Yu Lin, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 61 days.

(21) Appl. No.: 13/296,239

(22) Filed: Nov. 15, 2011

(65) Prior Publication Data

US 2013/0021683 A1 Jan. 24, 2013

(30) Foreign Application Priority Data

Jul. 22, 2011 (TW) .............................. 100125901 A

(51) Int. Cl.
*G02B 7/02* (2006.01)
*G02B 15/14* (2006.01)

(52) U.S. Cl.
USPC ............................ 359/819; 359/694; 359/822

(58) Field of Classification Search
USPC .................................. 359/694–704, 811–830
See application file for complete search history.

(56) References Cited

U.S. PATENT DOCUMENTS

| | | | | |
|---|---|---|---|---|
| 7,751,131 B2 * | 7/2010 | Huang et al. | ................... | 359/819 |
| 8,300,328 B2 * | 10/2012 | Kang et al. | ..................... | 359/811 |
| 2009/0244735 A1 * | 10/2009 | Sasaki | ........................... | 359/830 |
| 2010/0027137 A1 * | 2/2010 | Noh et al. | ..................... | 359/811 |

* cited by examiner

*Primary Examiner* — Mohammed Hasan
(74) *Attorney, Agent, or Firm* — Altis Law Group, Inc.

(57) ABSTRACT

A lens module includes a lens barrel, a first lens, a second lens, and a spacer. The lens barrel includes an object-side end and an image-side end opposite to the object-side end. The first lens is received in the lens barrel, and adjacent to the object-side end. The second lens is received in the lens barrel, and adjacent to the image-side end in relative to the first lens. The spacer is an annular plate, and includes an object-side surface, an image-side surface opposite to the object-side surface, and an inner sidewall. The spacer is positioned between the first lens and the second lens. The object-side surface faces the first lens, and the image-side surface faces the second lens. The intersection of the object-side surface and the inner sidewall forms a chamfer.

7 Claims, 4 Drawing Sheets

LENS MODULE

BACKGROUND

1. Technical Field

The present disclosure relates to lens modules and, particularly, to a lens module with a spacer.

2. Description of Related Art

Lens modules generally include a first lens, a second lens, and a spacer. The spacer is disposed between the first lens and the second lens and used for blocking light rays. However, the spacer is typically annular and includes an inner cylindrical surface, which may redirect light rays to the second lens and adversely affect the image quality.

Therefore, it is desirable to provide a lens module, which can overcome the limitations described.

DETAILED DESCRIPTION

Embodiments of the disclosure will now be described in detail, with reference to the accompanying drawings.

Figure 1:
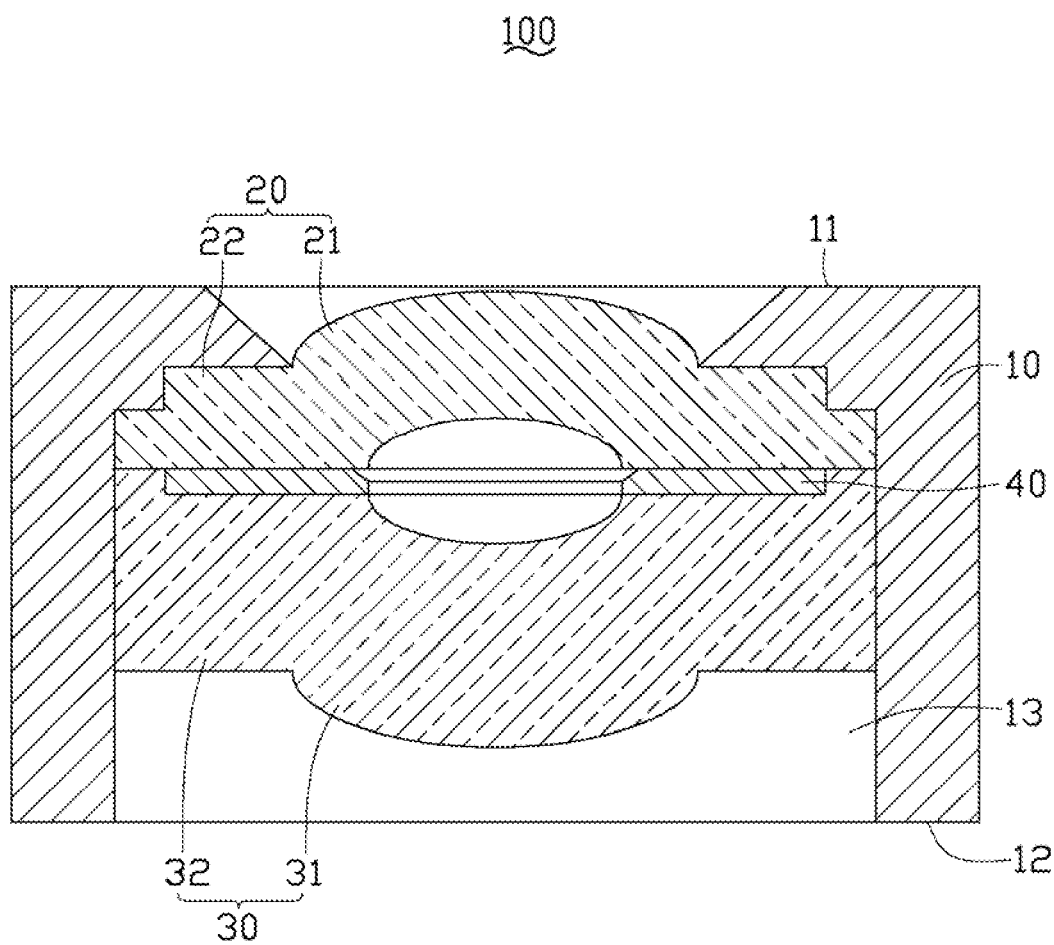
FIG. 1 is a cross-sectional schematic view of a lens module of an exemplary embodiment.

Referring to FIG. 1, a lens module 100, according to an exemplary embodiment, includes a lens barrel 10, a first lens 20, a second lens 30, and a spacer 40.

The lens barrel 10 is tubular and includes an object-side end 11 and an image-side end 12 opposite to the object-side end 11. The lens barrel 10 defines a through hole 13 extending through the object-side end 11 and the image-side end 12. In this embodiment, the lens barrel 10 is made of light-shield/opaque/black materials.

The first lens 20 is received in the through hole 13, adjacent to the object-side end 11. The first lens 20 includes a first optical portion 21 and a first non-optical portion 22 surrounding the first optical portion 21.

The second lens 30 is received in the through hole 13 between the first lens 20 and the image-side end 12. The second lens 30 includes a second optical portion 31 and a second non-optical portion 32 surrounding the second optical portion 31.

In this embodiment, the first lens 20 and the second lens 30 are made of glass or plastic, and are spherical lenses or aspheric lenses. The first optical portion 21 and the second optical portion 31 are for forming images and it is desired that all light rays entering into the barrels 10 are collected to pass therethrough. The first non-optical portion 22 and the second non-optical portion 32 are not for imaging and therefore it is desired that no, or as few as possible, light rays pass therethrough. Of course, in other configurations of the lens module 100, other lenses can be included and arranged at any appropriate positions at two sides of the first lens 10 and the second lens 20.

Figure 2:
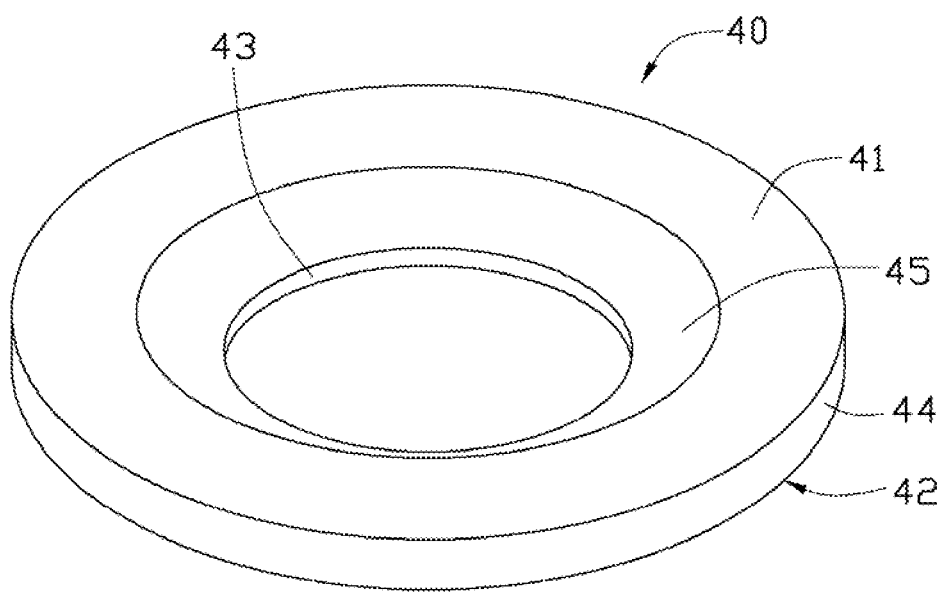
FIG. 2 is an isometric schematic view of a spacer of the lens module of FIG. 1.
Figure 3:
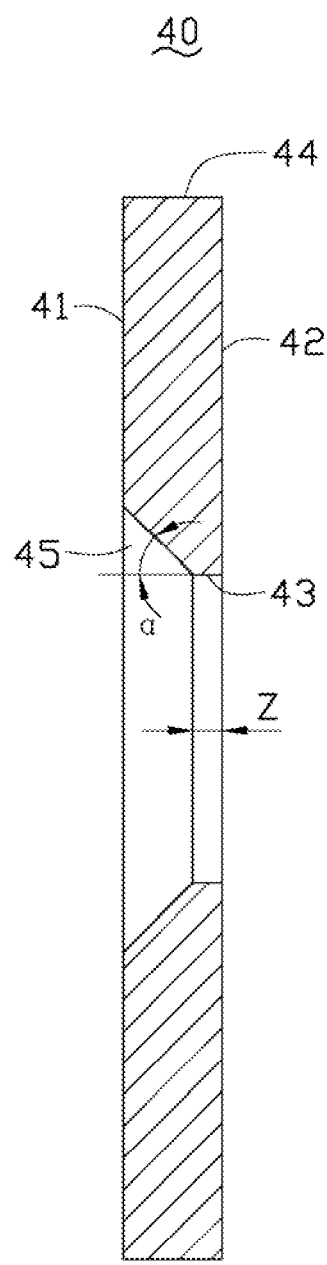
FIG. 3 is a cross-sectional schematic view of the spacer of FIG. 2.

Referring to FIGS. 2-3, the spacer 40 is an annular plate and made of light-shield/opaque/dark materials. The spacer 40 is received in the through hole 13, and is positioned between the first lens 20 and the second lens 30. The spacer 40 includes an object-side surface 41, an image-side surface 42, a cylindrical inner sidewall 43, and a cylindrical outer sidewall 44. The object-side surface 41 faces the object-side end 11 of the lens module 10, and the image-side surface 42 faces the image-side end 12. The inner sidewall 43 and the outer sidewall 44 are parallel with an optical axis of the lens module 100.

The intersection of the first surface 41 and the inner surface 43 form a chamfer 45. In this embodiment, the chamfer 45 is bevel shaped. An included angle α is formed between the chamfer 45 and the optical axis of the lens module 100. The included angle α is open toward the object-side end 11 and is larger than about 30 degrees but less than about 60 degrees. The length Z of the inner sidewall 43 measured in a direction that is substantially parallel to the optical axis of the lens module 100 is smaller than about 0.01 mm. The spacer 40 is sandwiched between the first non-optical portion 22 and the second non-optical portion 32.

In use, light rays enter into the lens module 100 from the object-side surface 11 of the lens barrel 10 and project on the first lens 20. A first part of light rays penetrates through the first optical portion 21 of the first lens 20, a through hole (not labeled) of the spacer 40, and the second optical portion 31 of the second lens 30, and then projects onto an image sensor (not shown). A second part of the light rays penetrates through the first non-optical portion 22 of the first lens 20, and then is blocked by the spacer 40. A third part of light rays penetrates through the first optical portion 21 of the first lens 20, and then projects onto the chamfer 45. As the chamfer 45 faces the object-side surface 11, the light rays projected on the chamfer 45 will not be reflected off the chamfer 45 to the second lens 30.

Figure 4:
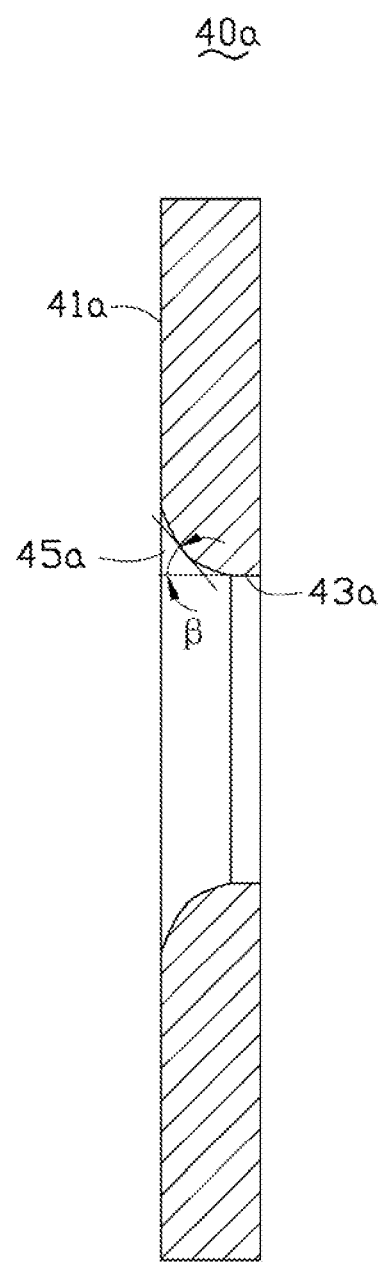
FIG. 4 is a cross-sectional schematic view of another embodiment of a spacer.

Referring to FIG. 4, another embodiment of a spacer 40a is similar to the spacer 40 of FIGS. 1-3, except that the intersection of an object-side surface 41a and an inner surface 43a forms a chamfer 45a. In this embodiment, the chamfer 45a is arc shaped. An included angle β is formed between a tangent plane of the chamfer 45a and the optical axis of the lens module 100. The included angle β is open toward the object-side end 11 and is larger than about 30 degrees but less than about 60 degrees.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module, comprising: a lens barrel comprising an object-side end and an image-side end opposite to the object-side end; a first lens received in the lens barrel, and adjacent to the object-side end; a second lens received in the lens barrel, and adjacent to the image-side end in relative to the first lens; and a spacer positioned between the first lens and the second lens, the spacer being an annular plate, and comprising an object-side surface, an image-side surface opposite to the object-side surface and an inner sidewall, the object-side surface facing the first lens, the image-side surface facing the second lens, an intersection of the object-side surface and the inner sidewall forming a chamfer wherein an included angle is formed between the chamfer and an optical axis of the lens module, the included angle is greater than about 30 degrees and less than about 60 degrees.

2. The lens module of claim 1, wherein the chamfer is bevel shaped.

3. The lens module of claim 1, wherein the chamfer is arc shaped.

4. The lens module of claim 3, wherein an included angle is formed between a tangent plane of the chamfer and the optical axis of the lens module, the included angle is greater than about 30 degrees and less than about 60 degrees.

5. The lens module of claim 1, wherein a width of the inner sidewall in a direction that is substantially parallel to the optical axis of the lens module is less than about 0.01 mm.

6. The lens module of claim 1, wherein the first lens comprises a first optical portion and a first non-optical portion surrounding the first optical portion, the second lens comprises a second optical portion and a second non-optical portion surrounding the second optical portion.

7. The lens module of claim 6, wherein the spacer is sandwiched between the first non-optical portion and the second non-optical portion.

* * * * *